Nov. 6, 1962 W. H. CAMPBELL 3,062,257
PNEUMATIC TIRE CONSTRUCTION
Filed Aug. 29, 1960

INVENTOR.
WILLIAM H. CAMPBELL
BY
J. B. Holden
ATTORNEY 3,062,257
Patented Nov. 6, 1962

3,062,257
PNEUMATIC TIRE CONSTRUCTION
William H. Campbell, Cuyahoga Falls, Ohio, assignor to The Goodyear Tire & Rubber Company, Akron, Ohio, a corporation of Ohio
Filed Aug. 29, 1960, Ser. No. 52,517
2 Claims. (Cl. 152—354)

This invention relates to a pneumatic tire construction and, more particularly, to a pneumatic tire made of two plies of textile cord material.

Pneumatic passenger tires have been made which include an even number of textile cord plies extending from bead to bead at an angle of 30 to 40° relative to the centerline of the tread. Practically all such tires for the commercial markets are today, and have been for many years past, constructed of at least four such reinforcing plies in spite of the fact that a two-ply tire possesses many advantages. For example, a two-ply tire is less expensive both from the standpoint of material and labor costs; is lighter in weight; has less heat build-up; and has less flat spotting.

It has also been known that a two-ply tire could be made having a ply rating or carcass strength comparable to that of a four-ply tire. For any tire designed to carry a given load, it is apparent that two plies of reinforcing fabric can be made to approximately equal the strength of four plies by increasing the denier of the cord, and/or the number of filaments in the cord, and/or the number of cords per inch in the two plies so that each ply used in a two-ply tire would have comparable strength to that used in a four-ply tire.

Notwithstanding this obvious expedient of making the carcass strength of a two-ply tire comparable to a four-ply tire no commercially feasible two ply tire has been marketed because prior to this invention two-ply tires have possessed certain flex characteristics which cause ply separation in the tread, crown or shoulder of the tire and such tires have not had sufficient resistance to fabric flex fatigue for modern automobile operating conditions.

Certain two-ply tires have been made which have performed satisfactorily known as "radial ply belted tires." Such tires contain reinforcing cords extending from bead to bead in a substantially radial direction from 80 to 90° relative to the bead of the tire. In addition, these tires included a substantially inextensible breaker construction made of a plurality of plies of cord material which operate substantially like a belt. Such tires have distinct advantages over conventional ply tires but are costly to produce because the inextensible breaker construction must be applied to the carcass after a shaping operation which forms the tire into toric shape. The primary disadvantage of such tires is their comparative lateral instability unless the breaker is made extremely rigid and inextensible.

An object of this invention is to provide a conventional ply tire having an improved resistance to ply separation in the shoulder and bead areas of the tire and improved resistance to fabric flex fatigue.

Another object of the present invention is to provide a two-ply pneumatic tire in which the plies extend at conventional angles and in which the flex concentrations in the bead and shoulder areas are reduced so that the tire performs comparably with a four-ply tire.

Further advantages and objects of the invention will become apparent with reference to the accompang drawings and description in which.

Figures 1, 2:
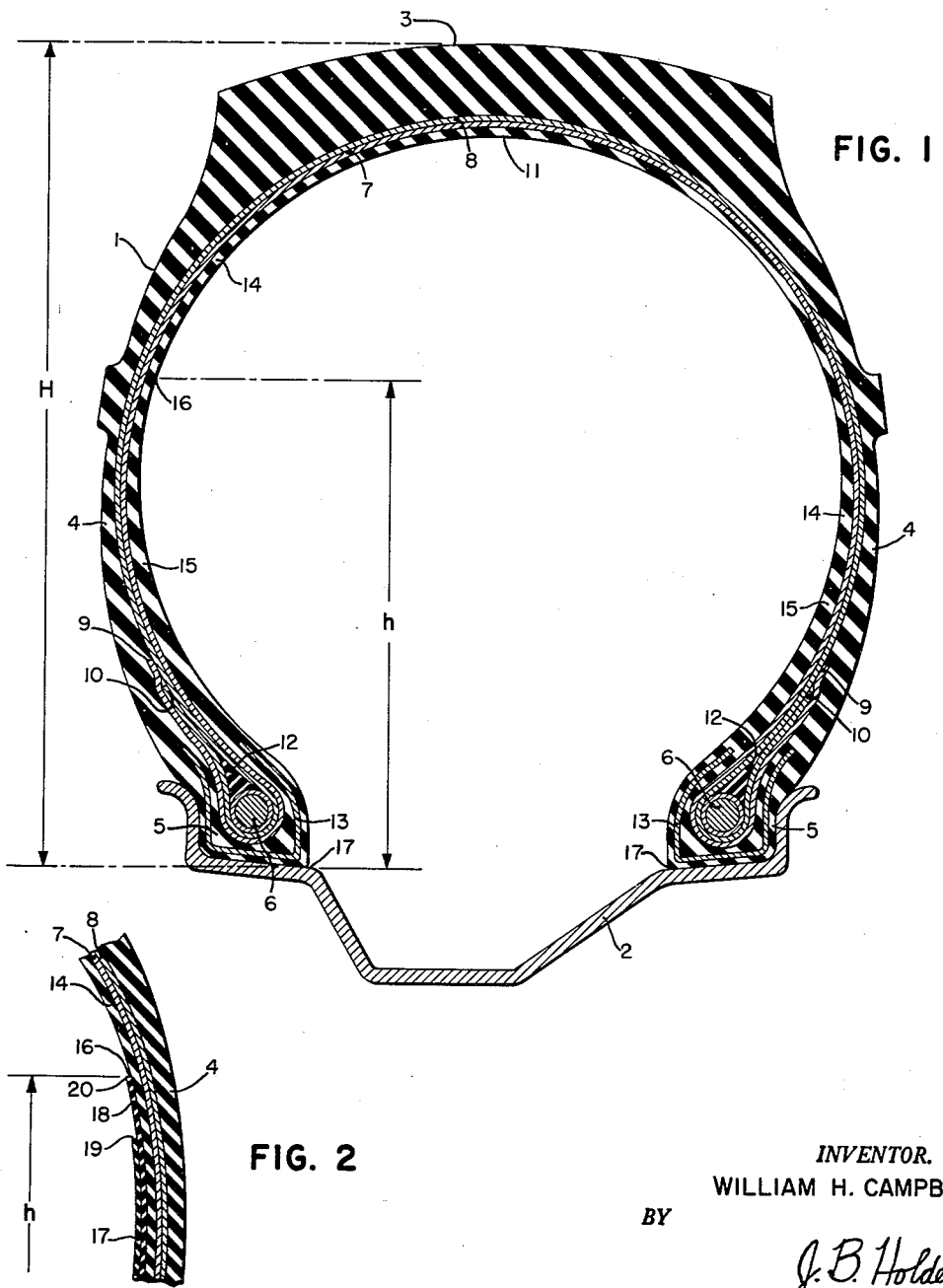
FIG. 1 is a cross sectional view of a tire casing embodying the present invention.
FIG. 2 is a partial cross sectional view of the tire shown in FIG. 1 prior to cure.

Referring to the drawing numeral 1 indicates a tire casing mounted on a rim 2 having a tread portion 3, a pair of sidewalls 4, and a pair of bead portions 5. A bead ring 6 made of a plurality of turns of wire is positioned within each bead portion 5 of the tire.

A pair of plies 7 and 8 of rubberized textile cord fabric extend from one bead portion to the other bead portion with the ends 9 and 10 of the plies turned around the bead rings 6. Plies 7 and 8 are made of bias angle cord fabric such that the cords in the crown area 11 of the tire extend at equal and opposite angles relative to the centerline of the tire in a range of 30 to 40°. A conventional apex strip 12 is disposed above each bead 6 to fill the space formed by the turn-up ply endings 9 and 10. A chafer 13 of conventional construction is likewise disposed about each of the bead portions 5.

The entire inner surface of the tire is provided with a liner generally referred to by the numeral 14 which extends from one bead area 5 across the inner surface of the sidewalls 4 and across the crown area 11. In accordance with this invention the thickness of the liner 14 in the crown area 11 is substantially uniform but the thickness of the liner 14 in the sidewall area 4 is substantially greater than the thickness of the liner in the crown area 11. The portion 15 of the liner 14 of greater thickness extends from the bead area 5 towards the crown of the tire 11 and terminates at a point 16 which is positioned at a distance $h$ from the base 17 of the bead portion 5. Preferably the distance $h$ equals approximately one-half to two-thirds of the overall sectional height $H$ of the tire. As indicated above, the portion 15 of the liner is substantially thicker than the remaining portion of the liner 14 extending across the crown area 11 of the tire and radially inwardly to the point 16.

Preferably the portion 15 is at least twice the thickness of the remaining portion of the liner which portion extends from point 16 in one sidewall across the crown to the point 16 in the opposite sidewall For example, the thickness of the liner extending across the crown may be 30 to 60 thousandths of an inch in thickness whereas the portion 15 would have a minimum thickness of 60 thousandths or a maximum thickness of 120 thousandths of an inch. In practice, the juncture or terminal point 16 between the thick and thin portions of the liner 14 is not an abrupt step-off but preferably the two thicknesses gradually coincide with each other by building up the thicker portion 15 of the liner by means of a plurality of plies 17 and 18, as shown in FIG. 2, extending circumferentially around the inner portion of the tire with the plies stepped off as at 19 and 20 in the green state. After cure such step-offs are compressed so that the rubber in the area step-offs 19 and 20 flows into a gradual and smoothly contoured surface.

To demonstrate the effectiveness of the present construction a number of tires were built and tested in direct comparison with control tires, constructed in the same manner as this invention except that the liner was made of uniform thickness throughout the entire inner surface of the tire. In one series of tests, the tire of the invention was subjected to a ply separation test in which the tire was run on the inner periphery of a driven cylinder at high loads which submits the carcass and tread to extreme deflection due to the concavity of the cylinder so that failure of the tire occurs as a separation in the tread, breaker or shoulder area. Carcass separation did not occur in tires of this invention until an average of some 6000 miles, whereas the corresponding control tires tested under identical conditions lasted on the average of 2500 miles, an improvement of over 300% in resistance to carcass separation.

Other comparative tests were conducted to determine the resistance to separation in the bead area of the tire.

In these tests the tires were run on the internal surface of a driven cylinder at high speeds and high inflation which places excessive stresses on the bead regions of the tire but not on the tread regions since the tread is not deflected excessively due to the concavity of the cylinder. Bead separation did not occur in tires of this invention until an average of some 7000 miles, whereas the corresponding control tire tested under identical conditions lasted only 4000 miles on the average before failure.

While certain representative embodiments and details have been shown for the purpose of illustrating the invention, it will be apparent to those skilled in the art that various changes and modifications may be made herein without departing from the spirit or scope of the invention.

What is claimed is:

1. A tubeless pneumatic tire construction comprising a toric shaped body having a pair of beads, sidewall portions and a tread, a pair of reinforcing cord plies extending from bead to bead in which the cords at the crown of the tire extend at an angle of 30° to 40° relative to the circumferential centerline of the tire, the interior surface of said tire having a rubber liner secured thereto, said liner having a portion which is thicker from the bead area radially outwardly into the sidewall area to a position in the sidewall area located from one-half to two-thirds of the sectional height of the tire, the remaining portion of said liner having a uniform thickness of from thirty to sixty thousandths of an inch, said thicker portion of the liner being at least twice the thickness of the remaining portion of said liner.

2. A tubeless tire as claimed in claim 1 in which the radially outer edge of said thicker portion of said liner gradually and uniformly decreases in thickness to a thickness equal to that of the said remaining portion of said liner.

References Cited in the file of this patent

UNITED STATES PATENTS

| | | |
|---|---|---|
| 1,149,841 | Latour et al. | Aug. 10, 1915 |
| 1,530,574 | Paull | Mar. 24, 1925 |
| 2,501,372 | Benson | Mar. 21, 1950 |
| 2,752,980 | Riggs | July 3, 1956 |
| 2,786,507 | Howe et al. | Mar. 26, 1957 |
| 2,869,610 | Lippmann et al. | Jan. 20, 1959 |